United States Patent [19]

McCardle et al.

[11] Patent Number: 6,098,801
[45] Date of Patent: Aug. 8, 2000

[54] COLLATING STRIP AND STRIP ASSEMBLY FOR USE WITH A MANUAL WELDING TOOL

[75] Inventors: Thomas A. McCardle, Cincinnati; James W. Miser, Jr., Batavia, both of Ohio

[73] Assignee: Senco Products, Inc., Cincinnati, Ohio

[21] Appl. No.: 09/146,184

[22] Filed: Sep. 3, 1998

[51] Int. Cl.[7] ................................. B65D 85/20
[52] U.S. Cl. ..................... 206/443; 206/338; 219/98
[58] Field of Search .................. 206/338, 343–347, 206/443, 485, 820; 219/98; 227/136

[56] References Cited

U.S. PATENT DOCUMENTS

| | | | |
|---|---|---|---|
| 3,312,810 | 4/1967 | Neumeier | 219/98 |
| 3,841,472 | 10/1974 | Fuller et al. | 206/485 |
| 3,885,669 | 5/1975 | Potucek | 206/347 |
| 3,910,324 | 10/1975 | Nasiatka | 144/32 |
| 3,915,367 | 10/1975 | Potucek | 227/136 |
| 4,606,455 | 8/1986 | Grikis et al. | 206/347 |
| 4,684,022 | 8/1987 | Potucek | 206/347 |
| 5,452,796 | 9/1995 | Ohuchi | 206/347 |

*Primary Examiner*—Jim Foster
*Attorney, Agent, or Firm*—Jerrold J. Litzinger

[57] ABSTRACT

A system for automatically feeding studs to the electrode of a manual stud welding tool. The system comprises a magazine associated with the tool. The magazine receives a tandem row of studs mounted in and collated by a disposable mounting and collating strip assembly. A drive assembly is associated with the magazine to advance the mounting and collating strip assembly such that each stud, when it becomes the forwardmost stud of the tandem row, is properly positioned with respect to the tool to be welded to a workpiece.

16 Claims, 7 Drawing Sheets

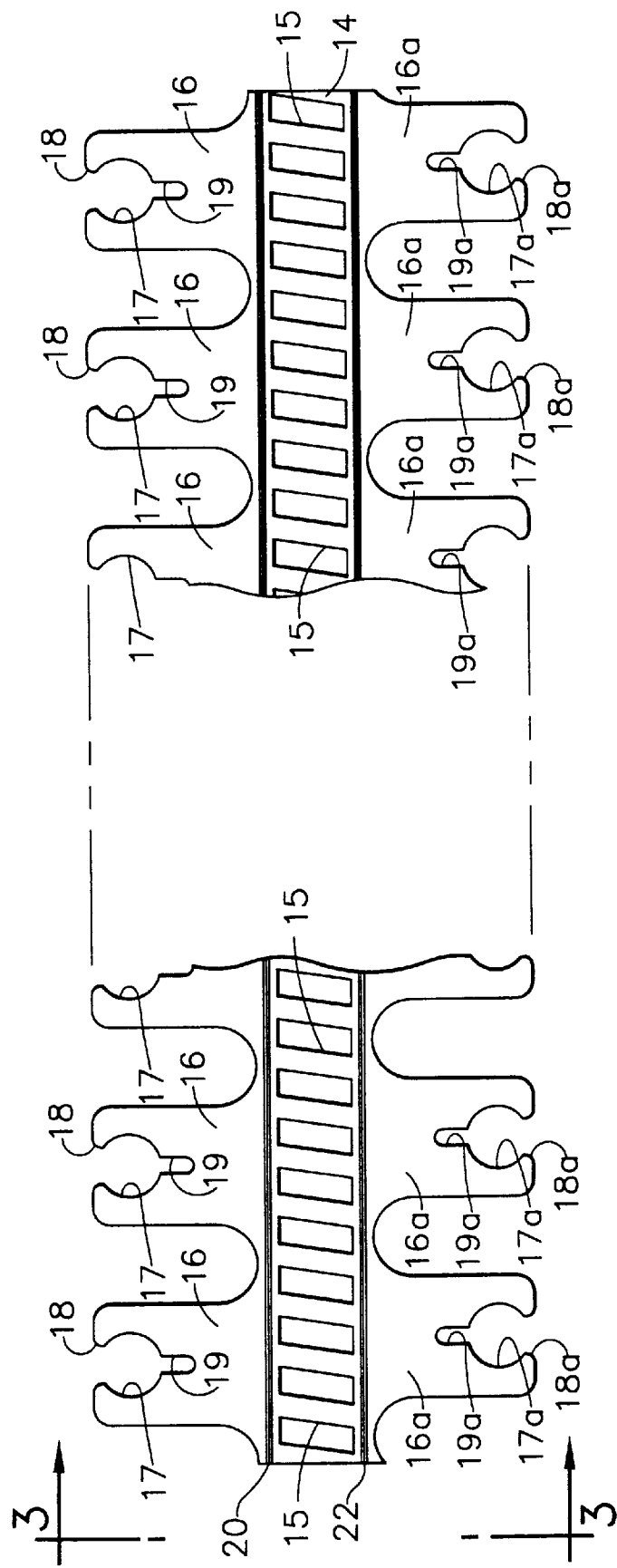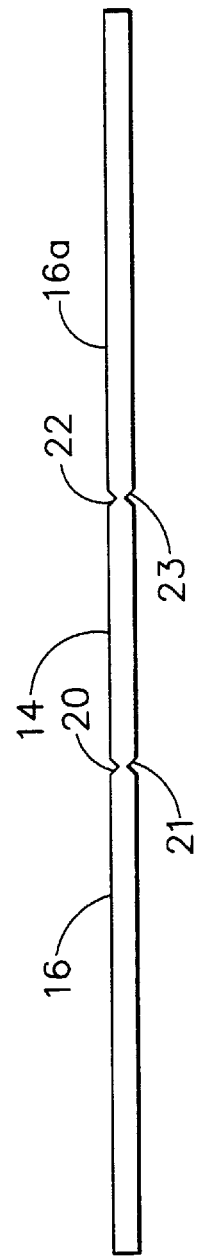
FIG. 2
FIG. 3

COLLATING STRIP AND STRIP ASSEMBLY FOR USE WITH A MANUAL WELDING TOOL

TECHNICAL FIELD

The invention relates to stud welding and more particularly to a collating strip and a strip assembly made therefrom for feeding studs to the electrode of a manual stud welding tool.

BACKGROUND ART

The art of stud welding is well known. The present invention is directed to that part of the stud welding art employing a manual stud welding tool. Prior art workers have devised a number of different types of stud welding tools, all of which operate in substantially the same manner. The tool operator manually mounts an individual stud on the electrode of the tool. The operator then causes the tool to press the free end of the stud against the workpiece surface at the position to which the stud is to be mounted. Electrical current is imparted to the stud which is slightly raised from the workpiece to initiate an arc. The free end surface of the stud and the adjacent surface area of the workpiece are rendered molten by the arc. The molten end of the stud is pressed against the molten surface of the workpiece to weld the stud to the workpiece, and the electrical current is turned off.

The prior art tools are characterized by the fact that each stud to be welded to the workpiece must be individually and manually engaged with the tool electrode. This requires a considerable amount of manipulation and inconvenience, and increases the time required to weld each stud.

The present invention is based upon the discovery that a stud welding tool can be provided with a magazine capable of containing a number of studs. The present invention contemplates the use of a stud supporting and collating strip assembly made of two identical pieces of a collating strip. The invention further contemplates a unique drive assembly for shifting each stud, in sequence, to its proper position with respect to the tool to be welded to the workpiece. That part of the support and collating strip assembly from which studs have been welded and removed will simply part and bend out of the way during subsequent welding operations. When all of the studs of the strip assembly have been welded, the rearwardmost position of the strip assembly may be removed from the tool and the strip assembly may be discarded.

DISCLOSURE OF THE INVENTION

According to the invention there is provided a system for automatically feeding studs to the electrode of a manual stud welding tool. The system comprises three primary elements. The first is a magazine associated with the tool. The second is a disposable strip assembly adapted to mount and collate a row of studs. The strip assembly and the studs supported thereby are slidably receivable in the magazine. The third element is a drive assembly associated with the magazine and adapted to advance the mounting and collating strip assembly in such a manner that each stud, when it becomes the forward most stud of the row, is located in the welding position with respect to the tool.

In a preferred embodiment, the stud mounting and collating strip assembly comprises two identical pieces of a flexible collating strip. The two strip pieces are oppositely folded into U-shaped cross sections and are caused to engage the studs from opposite sides. When the studs are fully engaged, the two strips form a single, relatively rigid strip assembly having a substantially rectangular cross section.

As a result, the strip assembly has a longitudinal top, a longitudinal bottom and longitudinal sides. The sides of the strip are provided with identical slot in parallel spaced relationship.

One side of the magazine is provided with a strip driving mechanism comprising a prime mover, a gear train and a gear, the teeth of which engage the slots in one side of the strip assembly to shift the strip assembly forwardly in the magazine.

BRIEF DESCRIPTION OF THE DRAWINGS

FIG. 2 is a fragmentary plan view of a collating strip of the present invention.

FIG. 3 is an end view of the collating strip of FIG. 2.

DETAILED DESCRIPTION OF THE INVENTION

Figure 1:
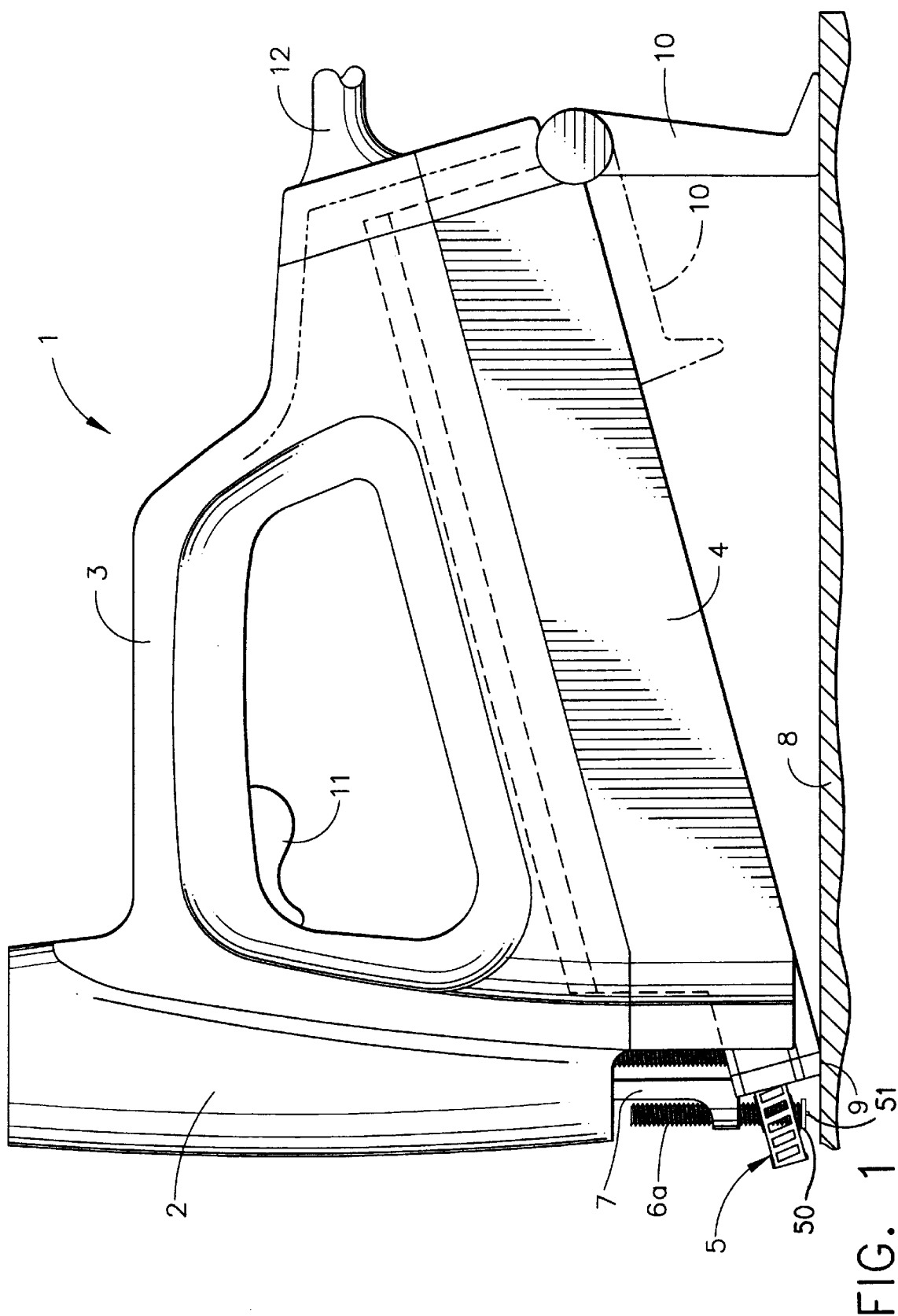
FIG. 1 is a side elevational view of the stud welding tool of the present invention.

For purposes of this description and in the claims, the front, rear, left side and right side, top and bottom of the tool are based upon the drawings and the operator's view of the tool when manually held by the operator in the position shown in FIG. 1. It will be understood that the tool can be held in any orientation during use, depending on the orientation of the workpiece to which the studs are to be welded.

Reference is first made to FIG. 1 in which an exemplary stud welding tool, incorporating the magazine and stud feed system of the present invention, is illustrated. The tool is generally indicated at 1 and has a forward main body portion 2, and a handle portion, 3. The magazine of the present invention is shown at 4. The stud mounting and collating strip assembly is shown at 5 with the forwardmost stud indicated at 6(a). The tool 1 is provided with an electrode 7 which is adapted to clamp the forwardmost stud 6(a) and to shift the stud toward work surface 8 in a manner similar to that described above with respect to the tools of the prior art. The magazine 4 is provided with a forward surface 9 which may be caused to engage the workpiece 8 to stabilize the tool. Pivotally affixed to the rearward end of the tool there is a flip down stabilizer 10 which is shiftable between a retracted position shown is broken lines and extended position shown is solid lines.

As also seen in FIG. 1, the blunt lower end 50 of each welding stud 6 that is to be welded to the surface, comprises a projection 51 extending from this blunt lower end to facilitate this operation.

While the magazine 4 may be configured to extend parallel to work surface 8 for some applications, the embodiment illustrated is configured to extend rearwardly and upwardly at an angle of about 15°, as shown in FIG. 1. This enables the magazine to clear a previously welded stud or other obstruction.

The tool is provided with an actuating trigger 11, and is completed by an appropriate cable connection (fragmentarily shown at 12) to a source of electrical current (not shown). While the teachings of the present invention will be described in terms of stud welding, tool 1 may be used with weld pins, refractory anchors, knurled pins and the like.

Figure 4:
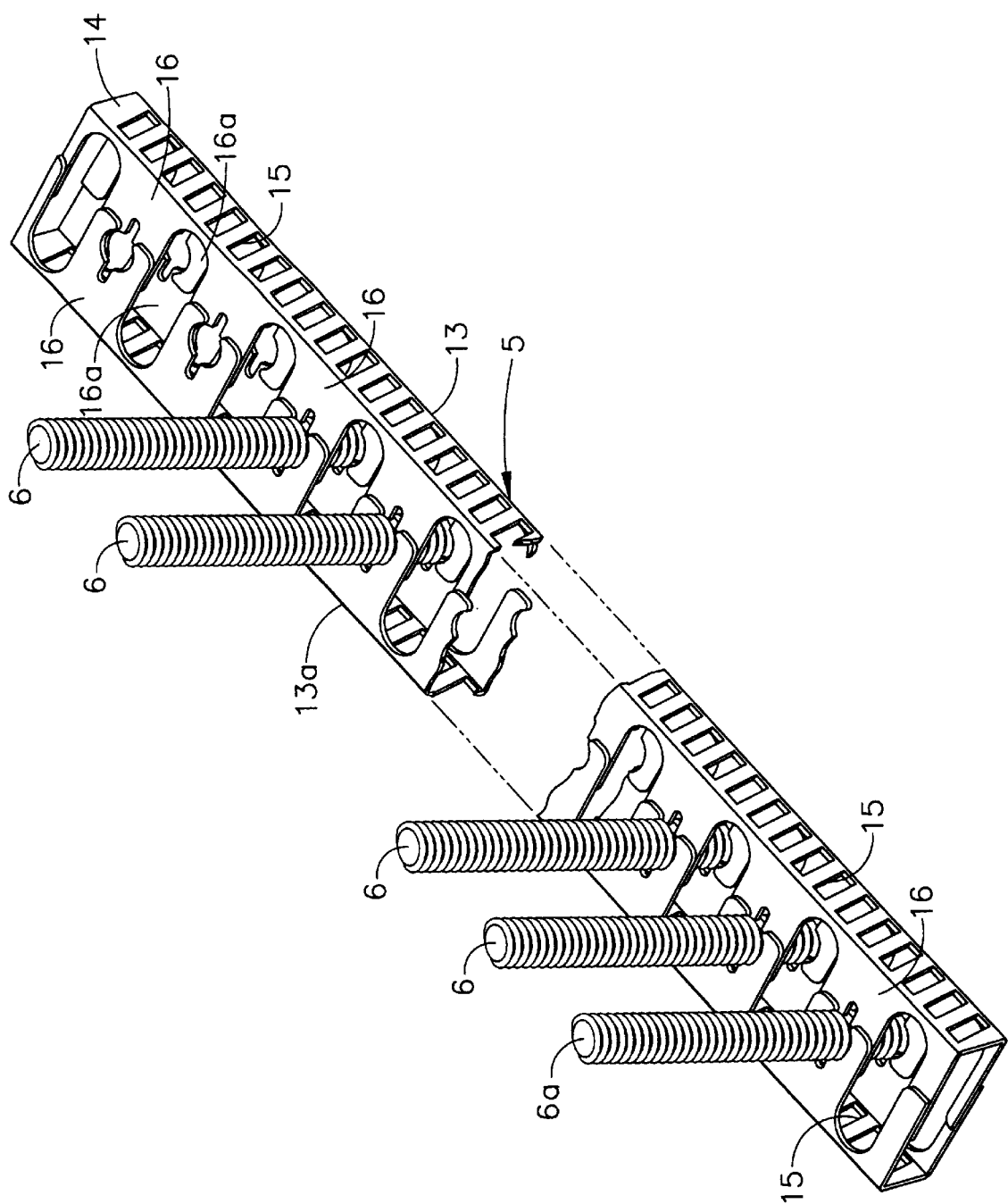
FIG. 4 is a fragmentary top, front and left side perspective view of a collating strip assembly of the present invention including a plurality of studs.

Reference is now made to FIG. 2 which illustrates a collating strip 13 from which the strip assembly 5 of FIGS. 1 and 4 is made. The strip 13 has a central longitudinal band portion 14 with a plurality of slots 15 formed therein in parallel spaced relationship. The purpose of slots 15 will be apparent hereinafter.

To one side of central band 14, the strip 13 has a plurality of laterally extending, identical tabs 16. Each tab 16 has a circular perforation 17, the purpose of which will be apparent hereinafter. It will be noted that each perforation 17 intersects the outermost edge of its respective tab creating an opening 18 having a width less than the diameter of circular perforation 17. Again, the purpose of opening 18 will be apparent hereinafter. It will further be noted that each tab 16 is provided with a short slot 19 which extends radially from the circular opening 17 and which is located diametrically opposite opening 18. Once again, the purpose of slot 19 will be apparent hereinafter.

The strip 13 has a second set of tabs extending laterally from central band 14 in the direction opposite that of tabs 16. These additional tabs are identical to tabs 16 and are indicated at 16(a). Each tab 16(a) has a circular perforation identical to a circular perforation 17 and indicated at 17(a). Each tab has an opening equivalent to opening 18, indicated at 18(a) and a slot equivalent to slot 19 indicated at 19(a).

It will be noted, however, that the tabs 16 and the tabs 16(a), while identical in configuration, are slightly offset longitudinally. This is dictated by the desire to provide the magazine 4 with an upwardly and rearwardly directed angularity with respect to the workpiece 8 (see FIG. 1). If tool 1 were so configured that the magazine is parallel to workpiece 8, then the tabs 16 and 16a would not be offset from each other, but rater would be directly opposite each other.

Reference is now made to FIG. 3 which is an end view of strip 13 of FIG. 2, as seen from the line 3—3 of FIG. 2. It will noted that the central band 14 is separated from the tabs 16 by a pair of scorelines 20 and 21 located to either side of the strip. Similarly, the central band is separated from the tabs at 16(a) by score lines 22 and 23 located to either side of the strip. The score lines 20–23 enable the tabs 16 and 16(a) to be bent to either side of central band 14, as will be apparent hereinafter.

The strip 13 may be molded of high-density polyethylene or the equivalent. While not intended as a limitation, a nominal thickness of 0.031 inch has been found satisfactory. The strip 13 may be of considerable length and may be coiled for shipping an storage. In an exemplary embodiment, the strip had a length of 500 meters (1640.42 feet).

Figure 7:
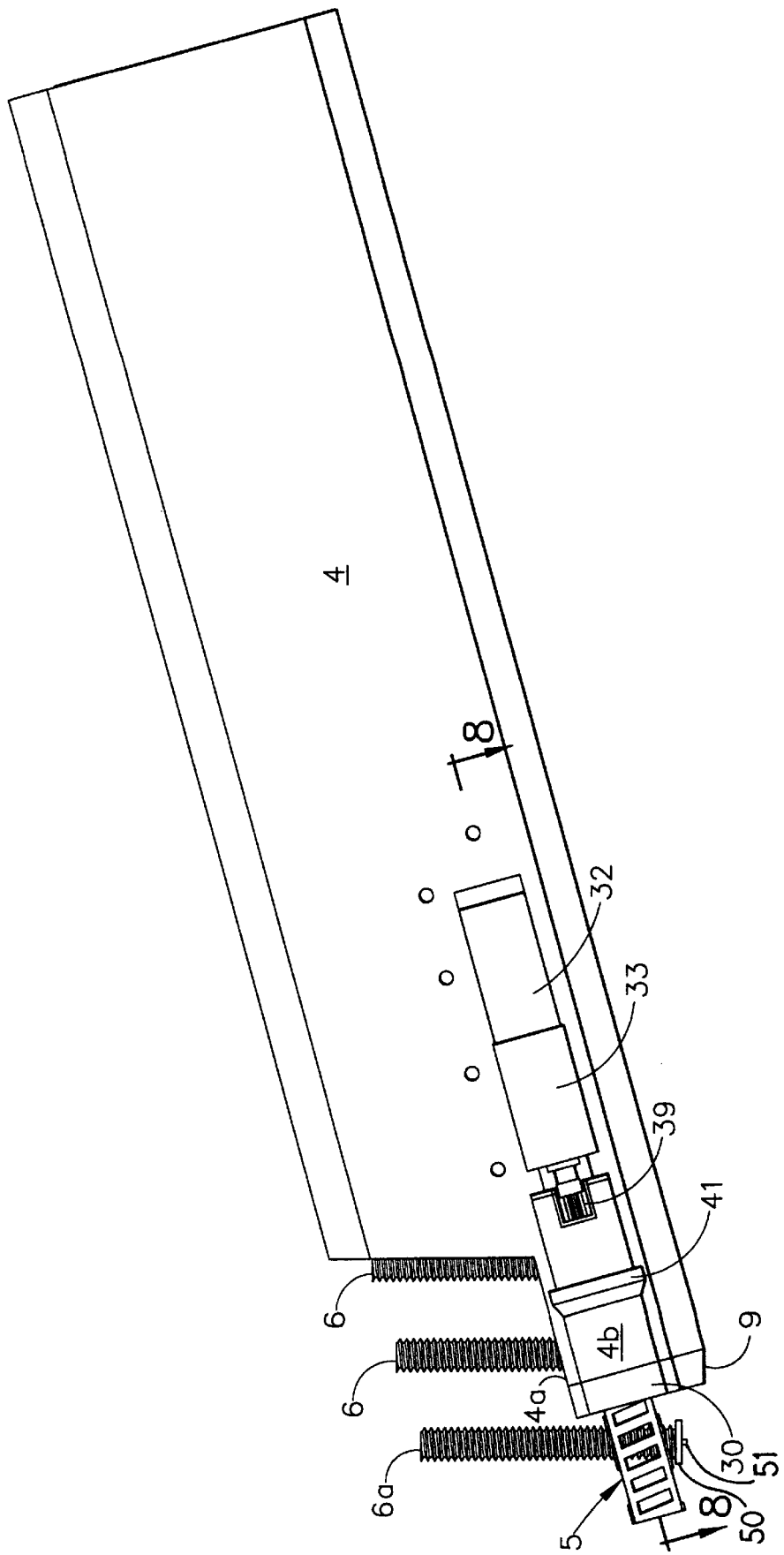
FIG. 7 is a left side elevational view of the magazine of FIG. 4 with the motor and gear box cover removed.

Reference is now made to FIG. 4 wherein the strip assembly 5, mounting and collating a row of studs, is fragmentarily illustrated. This assembly is made in the following manner. A first strip 13 is cut to length from the strip coil. A first strip 13 (see FIG. 2) has its tabs 16 and 16(a) folded into the paper (as viewed in FIG. 2) to form a U-shaped structure, the central band 14 comprising the base of the U-shaped structure and the tabs 16 and 16(a) forming the legs of the U-shaped structure. With the strip 13 in this configuration each stud is simultaneously shoved into the perforations 17 and 17a of a corresponding pair of tabs 16 and 16a via their respective openings 18 and 18a. the slots 19 and 19a help their respective openings 18 and 18a enlarge enough to allow the stud to enter their respective perforations 17 and 17a. As shown is FIGS. 1 and 7, the offset of each cooperating pair of tabs 16 and 16a enables each stud to be substantially vertical when the strip assembly 5 lies at an upward and rearward angle of about 15°. Next, a second strip 13a identical to strip 13 is removed from the coil and has its tabs folded oppositely (i.e. out of the paper as viewed in FIG. 2) to form a second U-shaped member. The second U-shaped member is located on the other side of studs 6 and 6a opposite strip 13. The tabs 16 of strip 13a overlap the tabs 16 of strip 13. Similarly, the tabs 16a of strip 13a underlap the tabs 13a of strip 13. The strip 13a is caused to shift toward strip 13 so that each stud will slip into the circular perforations 17 and 17a via openings 18 and 18a of its respective cooperating pair of tabs 16 and 16a of strip 13a, as shown in FIG. 4. The resulting structure is the strip assembly 5 which mounts and collates the first stud 6a and the remaining studs 6. The strip assembly 5 is substantially rectangular in cross-section which lends to the strip assembly a sufficient rigidity to mount and collate first stud 6a and the remaining studs 6. The number of studs supported by strip assembly 5 is not a limitation of the present invention. It has been found that such a strip holding 16 studs is easy to make, easy to handle and easy to package. It will be noted from FIG. 4 that the last two cooperating pairs of tabs 16 and 16a of strips 13 and 13a do not carry studs. This part of strip assembly 5 is used to support this strip assembly with respect to the magazine during the welding of the last stud of the row. The slots 19 and 19a of the tabs 16 and 16a also help the top and bottom of the strip assembly to flex when each stud is shifted axially by the tool electrode during a welding operation.

In some instances it may be preferred to form the strip assembly 5 from two separate coils of the collating strip. In this instance the strip assemblies 5 would be cut to length after assembly.

The strip assembly 5 can mount and collate both threaded and non-threaded studs and studs having a range of lengths from about ¾" to about 2". By proper sizing of the tool and magazine, this range of lengths may be varied.

Figure 5:
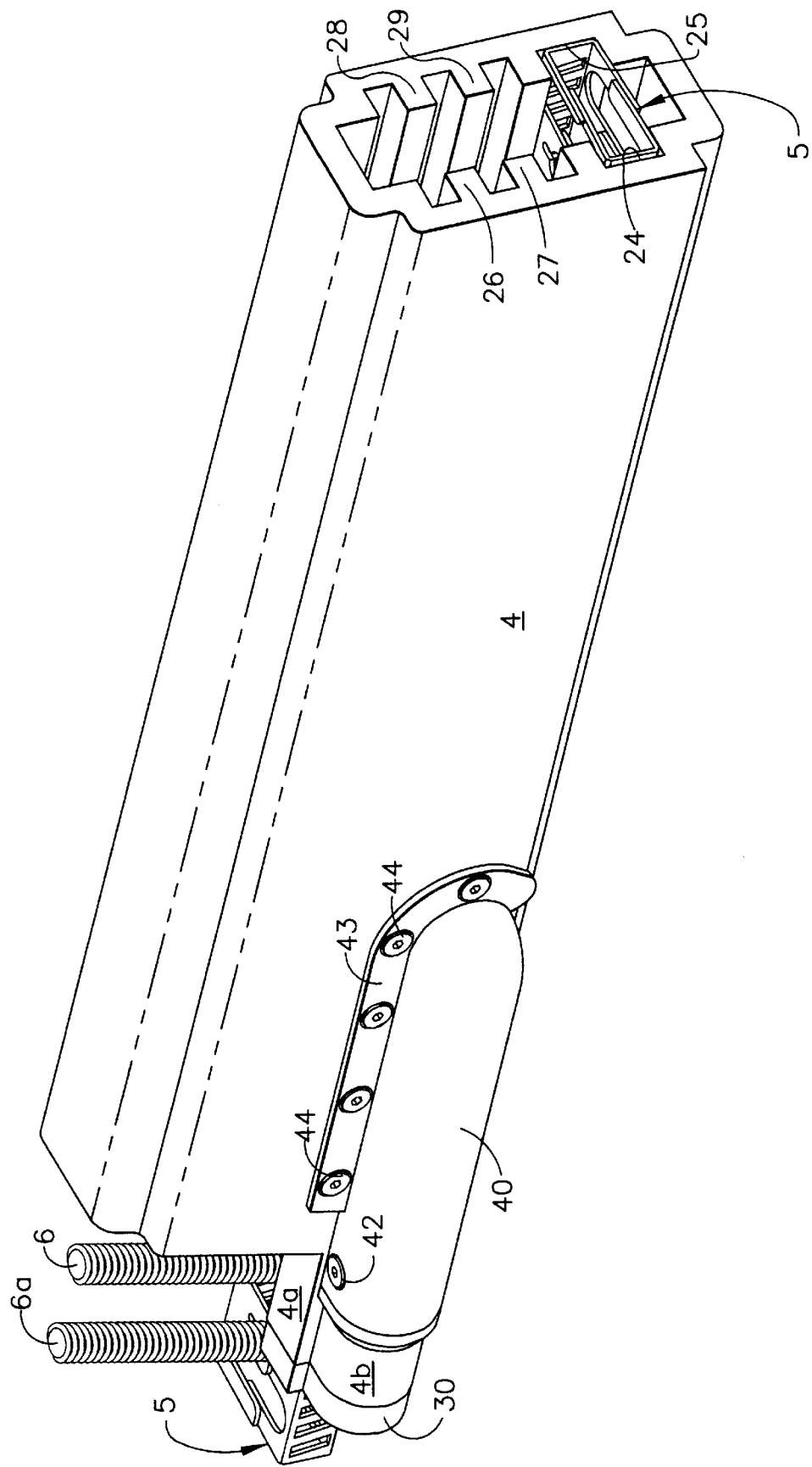
FIG. 5 is a left side, top and rear end perspective view of the magazine of the present invention including the collating strip assembly of FIG. 4.
Figure 6:
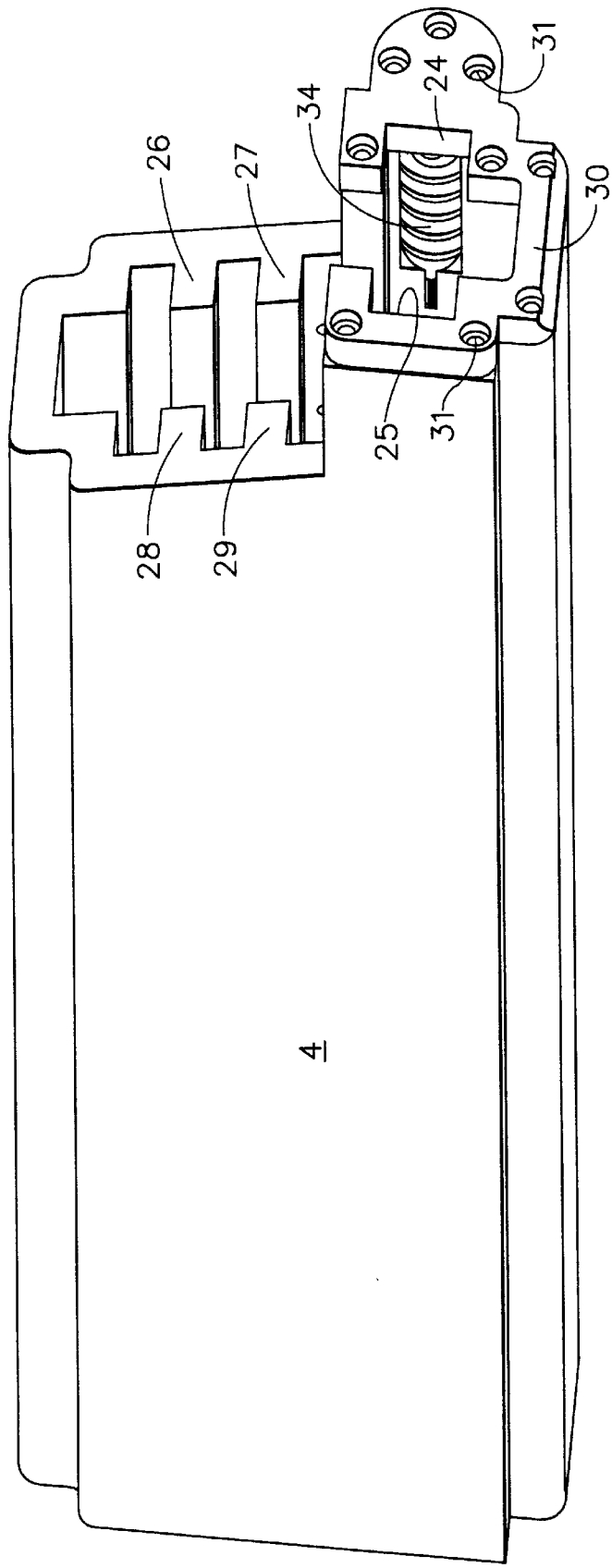
FIG. 6 is a front and right side perspective view of the magazine.

Reference is now made to FIGS. 5, 6, 7 and 8, wherein the magazine 4 and the drive assembly for the stud bearing strip assembly are shown. Turning first to FIGS. 5 and 6, it will be noted that the magazine 4 comprises an elongated hollow member having a pair of opposed, longitudinal slots 24 and 25 adapted to slidingly receive and guide the strip assembly 5. Above slots 24 and 25 magazine 4 contains two opposed pairs of longitudinal, inwardly directed opposed ribs 26, 27, 28 and 29, serving to guide the studs during their passage through the magazine 4.

At the forward end of magazine 4, that part of the magazine which contains grooves 24 and 25 is extended as at 4a. The extension 4a is an integral, one-piece part of magazine 4. The extension has a semi-cylindrical portion 4b which constitutes an integral, one-piece part of the extension. The extension is completed by an end cap 30 affixed to the forwardmost end of extension 4a and its semi-cylindrical portion 4b by a plurality of machine screws 31. It will be noted that the extension 4a and the end cap 30 continue the strip assembly-receiving slots 24 and 25. It would be within the scope of the invention to provide an end cap just for the semi-cylindrical portion 4b and the adjacent portion of extension 4a to enable removal of gear 34.

Figure 8:
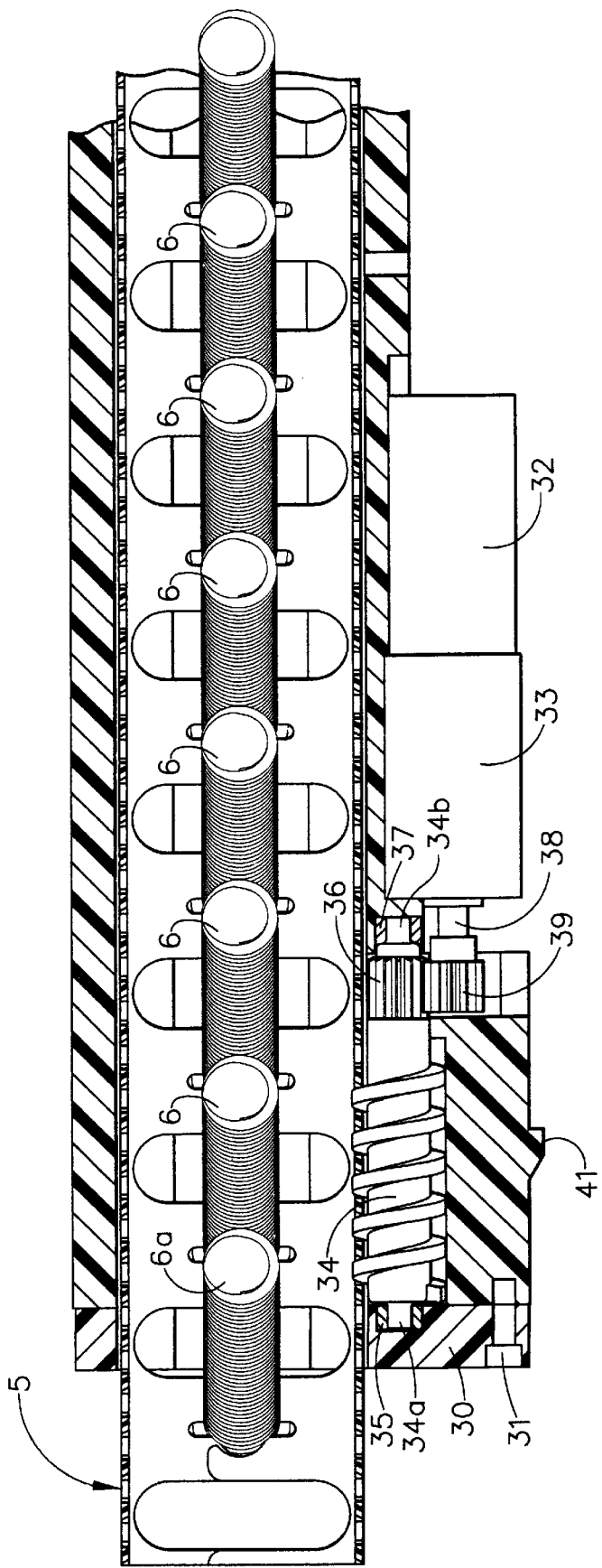
FIG. 8 is a longitudinal cross-sectional view taken along section line 8—8 of FIG. 7.

As is most clearly shown in FIG. 8, the drive assembly for the stud-mounting strip assembly 5 comprises and electric motor 32, a gear train 33 and a worm gear 34. At its forward end, worm gear 34 has a shaft portion 34a mounted in an appropriate bearing 35 located in end cap 30. At its other end, the worm gear 34 is provided with a driven gear 36 and an end shaft portion 34b mounted in an appropriate bearing 37. It will be noted that the worm gear teeth engage in the slots 15 of the adjacent strip constituting half of the strip assembly 5. It will be apparent from FIGS. such as FIGS. 2, 4, and 7 that the parallel spaced slots 15 are formed at an angle to accommodate the pitch of worm gear 34. Other types of gears could be used. For example, a spur gear could be used to drive the stud-bearing strip assembly 5. A work gear is preferred, however, because it requires a minimum lateral extension on magazine 4.

The motor 32 and the gear train box 33 are located behind and parallel to worm gear 34. Gear box 33 has an output shaft 38 terminating in a drive gear 39 meshed with the driven gear 36 of worm gear 34. Motor 32 and gear train 33 are held in position by a cover member 40. The forward end of cover 40 wraps about a part of the portion 4b of extension 4a. The portion 4b has a flange 41 thereon which is abutted by the forward end of cover 40. The cover 40 is threadedly attached to the portion 4b of extension 4a by one or more machine screws, one being shown at 42 in FIG. 5. Cover 40 is also provided with a flange 43 which is mounted on the left side of magazine 4 by machine screws 44. It will be understood that the worm gear 34, motor 32 and gear train box 33 could be mounted on the right side of magazine 4. Since the strip assembly 5 is made up of two identical collating strip lengths 13, the slots 15 are present on both longitudinal edges of the strip assembly 5.

The magazine is preferably made of non-conductive material such as nylon, ABS, polyurethane, or the like. The enclosure for motor 32 and gear train 33 may be made of any one of the same materials. End cap 30 is preferably made of nylon.

The invention having been described in detail, its operation can now be set forth. The operator will load a stud-bearing strip assembly 5 into magazine 4 from the rearward end thereof. The operator will shove the strip assembly 5 into the magazine until the forward end of strip assembly 5 contacts the lead in end of worm gear 34. The worm gear is then energized to advance the stud bearing strip assembly 5 until the forwardmost stud 6a is in position to be welded. At this point, worm gear 34 will automatically stop and the stud will be engaged and clamped by the electrode assembly 7 of tool 1.

Thereafter, the operator shoves downwardly on the tool until the forwardmost stud 6a contacts the workpiece at the position where it is to be welded. At this point, the operator actuates the trigger 11 of tool 1 to initiate the welding operation. The clamping electrode assembly 7 will automatically lift the stud from the work surface by an amount sufficient to initiate an arc so that the adjacent end of the stud and the adjacent portion of the workpiece surface will become molten. Thereafter, the stud will be shoved against the workpiece to complete the weld and the electric current will be automatically shut off.

At this point, the operator lifts the tool away from the workpiece and the welded stud will be disengaged from strip assembly 5. The next stud of the tandem row, now the first stud of the row, will automatically be shifted together with the strip assembly 5 to the welding position by the worm gear 34, motor 32 and gear train 33.

Modifications may be made in the invention without departing from the spirit of it. For example, it would be possible to provide a left collating strip and a right collating strip with score lines on one side only. It would also be within the scope of the invention to mold otherwise for left and right strips having a U-shaped cross-section.

What is claimed is:

1. A collating strip for use in a stud welding tool, said collating strip being an integral one-piece structure comprising a central longitudinal band having first and second longitudinal edge portions, and first and second lateral portions extending along said first and second edge portions of said band, the central longitudinal band separated from each of said first and second lateral portions by an opposed pair of longitudinal score lines, said first and second lateral portions having a plurality of corresponding openings spaced there along, said corresponding openings of said first and second lateral portions comprising cooperating pairs, said openings being configured to receive a stud, said first and second lateral portions being bendable to either side of said central band.

2. The collating strip claimed in claim 1 including a plurality of parallel, evenly spaced slots formed in said band.

3. The collating strip claimed in claim 1 wherein said first and second lateral portions each comprises a set of spaced tabs, said tabs of said first and second lateral portions being equal in number with corresponding tabs constituting cooperative pairs, each tab terminating in a free end, each tab having a circular perforation therein sized to receive a stud with a friction fit, each circular perforation intersecting its respective tab free end by a distance less than the diameter of said perforation enabling a stud to be shoved laterally into said perforation, a short narrow slot extending radially from each perforation and centrally of its respective tab toward said bend, rendering its tab more flexible.

4. The collating strip claimed in claim 1 including a plurality of parallel, evenly spaced slots formed in said central band portion of said collating strip.

5. A collating strip assembly comprising
first and second lengths of collating strip each of the form claimed in claim 1, wherein said first and second lengths of said collating strip are used to form a strip assembly for mounting and collating a tandem row of studs for use in a stud welding tool, said first length having its first and second lateral portions bent to one side of its central band to form a U-shaped length, and
a series of studs, each stud being located in a cooperating pair of openings in said first and second lateral portions of said first length, said second length having its first and second lateral portions bent to the other side of its central band to form a U-shaped length.

6. The collating strip assembly claimed in claim 5 wherein said first and second lateral portions of said second length overlap and underlap said first and second lateral portions of said first length respectively.

7. The collating strip claimed in claim 1 further comprising a series of studs, each stud being located in a cooperating pair of openings in said first and second lateral portions of said strip, said studs each comprising an elongated section with a blunt end having a projection extending therefrom.

8. The collating strip of claim 7 wherein each stud further comprises a cylindrical threaded section extending along at least a portion of its elongated section.

9. The collating strip of claim 7 wherein each stud further comprises a substantially circular cross section throughout the entire length thereof.

10. A collating and mounting strip assembly for collating studs for a stud welding tool, comprising first and second lengths of collating strip, each said length of collating strip comprising a central longitudinal band having first and second longitudinal edge portions, and first and second lateral portions extending along said first and second edge portions of said band, said first and second lateral portions having a plurality of corresponding openings spaced there along, said corresponding openings of said first and second lateral portions comprising cooperating pairs, said openings being configured to receive a stud, said first and second lengths having their first and second lateral portions bent to one side of the central band to form a U-shaped length, a series of studs, each stud being located in a cooperating pair of openings in said first and second lateral portions of said first and second lengths, whereby each stud is frictionally engaged by the first and second lateral portions of both lengths of said collating strip.

11. The collating strip assembly claimed in claim 10 including a plurality of parallel, evenly spaced slots formed in said central band portion of said collating strip.

12. The collating strip assembly claimed in claim 10 wherein said first and second lateral portions of said collating strip each comprises a set of spaced tabs, said tabs of said first and second lateral portions being equal in number with corresponding tabs constituting cooperative pairs, each tab terminating in a free end, each tab having a circular perforation therein sized to receive a stud with a friction fit, each circular perforation intersecting its respective tab free end by a distance less than the diameter of said perforation enabling a stud to be shoved laterally into said perforation, a short narrow slot extending radially from each perforation and centrally of its respective tab toward said bend, rendering its tab more flexible.

13. The collating strip assembly claimed in claim 10 wherein said first and second lateral portions of said second length overlap and underlap said first and second lateral portions of said first length respectively.

14. The collating strip assembly claimed in claim 10 wherein said studs each comprise an elongated section with a blunt end having a projection extending therefrom.

15. The collating strip of claim 10 wherein said studs each comprise a cylindrical threaded section extending along at least a portion of its elongated section.

16. The collating strip of claim 10 wherein said studs each comprise a substantially circular cross section throughout the entire length thereof.

* * * * *